| (12) | United States Patent | (10) Patent No.: | US 11,308,694 B2 |
|---|---|---|---|
| | Nakata | (45) Date of Patent: | Apr. 19, 2022 |

(54) IMAGE PROCESSING APPARATUS AND IMAGE PROCESSING METHOD

(71) Applicant: Sony Interactive Entertainment Inc., Tokyo (JP)

(72) Inventor: Masashi Nakata, Kanagawa (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 17 days.

(21) Appl. No.: 16/901,531

(22) Filed: Jun. 15, 2020

(65) Prior Publication Data

US 2020/0410755 A1 Dec. 31, 2020

(30) Foreign Application Priority Data

Jun. 25, 2019 (JP) .............................. JP2019-117482

(51) Int. Cl.
*G06T 15/00* (2011.01)
*G06T 19/00* (2011.01)
*G06K 9/00* (2022.01)
*G10L 15/08* (2006.01)

(52) U.S. Cl.
CPC .......... *G06T 19/00* (2013.01); *G06K 9/00302* (2013.01); *G06K 9/00355* (2013.01); *G10L 15/083* (2013.01); *G06T 2219/004* (2013.01); *G10L 2015/088* (2013.01)

(58) Field of Classification Search
None
See application file for complete search history.

(56) References Cited

U.S. PATENT DOCUMENTS

| 10,460,500 | B1* | 10/2019 | Hunt | G06T 15/005 |
|---|---|---|---|---|
| 2007/0075993 | A1* | 4/2007 | Nakanishi | A63F 13/87 345/419 |
| 2010/0128031 | A1* | 5/2010 | Uoi | G06Q 10/107 345/419 |
| 2013/0176302 | A1* | 7/2013 | Jeong | G06T 7/73 345/419 |
| 2014/0306891 | A1* | 10/2014 | Latta | G02B 27/017 345/158 |
| 2016/0267909 | A1* | 9/2016 | Hanaoka | G10L 15/065 |
| 2017/0109936 | A1* | 4/2017 | Powderly | G06F 1/163 |
| 2017/0140214 | A1* | 5/2017 | Matas | G06K 9/00302 |
| 2017/0149725 | A1* | 5/2017 | Kuriyama | H04L 51/046 |
| 2018/0075659 | A1* | 3/2018 | Browy | G06F 1/1686 |
| 2018/0081519 | A1* | 3/2018 | Kim | G06F 3/011 |
| 2018/0157317 | A1* | 6/2018 | Richter | G06T 19/006 |
| 2018/0246569 | A1* | 8/2018 | Arakawa | G06F 40/169 |
| 2018/0299948 | A1* | 10/2018 | Kikuchi | G06F 3/017 |
| 2018/0302499 | A1* | 10/2018 | Kada | A63F 13/5372 |
| 2018/0307303 | A1* | 10/2018 | Powderly | G06F 1/163 |
| 2019/0311189 | A1* | 10/2019 | Bryant, III | G06F 3/04845 |

(Continued)

*Primary Examiner* — Martin Mushambo
(74) *Attorney, Agent, or Firm* — Katten Muchin Rosenman LLP

(57) ABSTRACT

There is provided an image processing apparatus which includes a voice recognition section that recognizes a voice uttered by a user, a motion recognition section that recognizes a motion of the user, a text object control section that disposes an object of text representative of the contents of the voice in a three-dimensional virtual space, and varies text by implementing interaction based on the motion, and an image generation section that displays an image with the three-dimensional virtual space projected thereon.

19 Claims, 10 Drawing Sheets

(56) References Cited

U.S. PATENT DOCUMENTS

| | | | |
|---|---|---|---|
| 2019/0333261 A1* | 10/2019 | Nakashima | G06F 3/012 |
| 2019/0362557 A1* | 11/2019 | Lacey | G06F 3/012 |
| 2019/0363843 A1* | 11/2019 | Gordaychik | H04L 1/1854 |
| 2020/0033936 A1* | 1/2020 | Sugaya | G06F 3/017 |
| 2020/0219295 A1* | 7/2020 | el Kaliouby | G06K 9/00302 |
| 2020/0372902 A1* | 11/2020 | Takami | G03B 21/62 |

\* cited by examiner

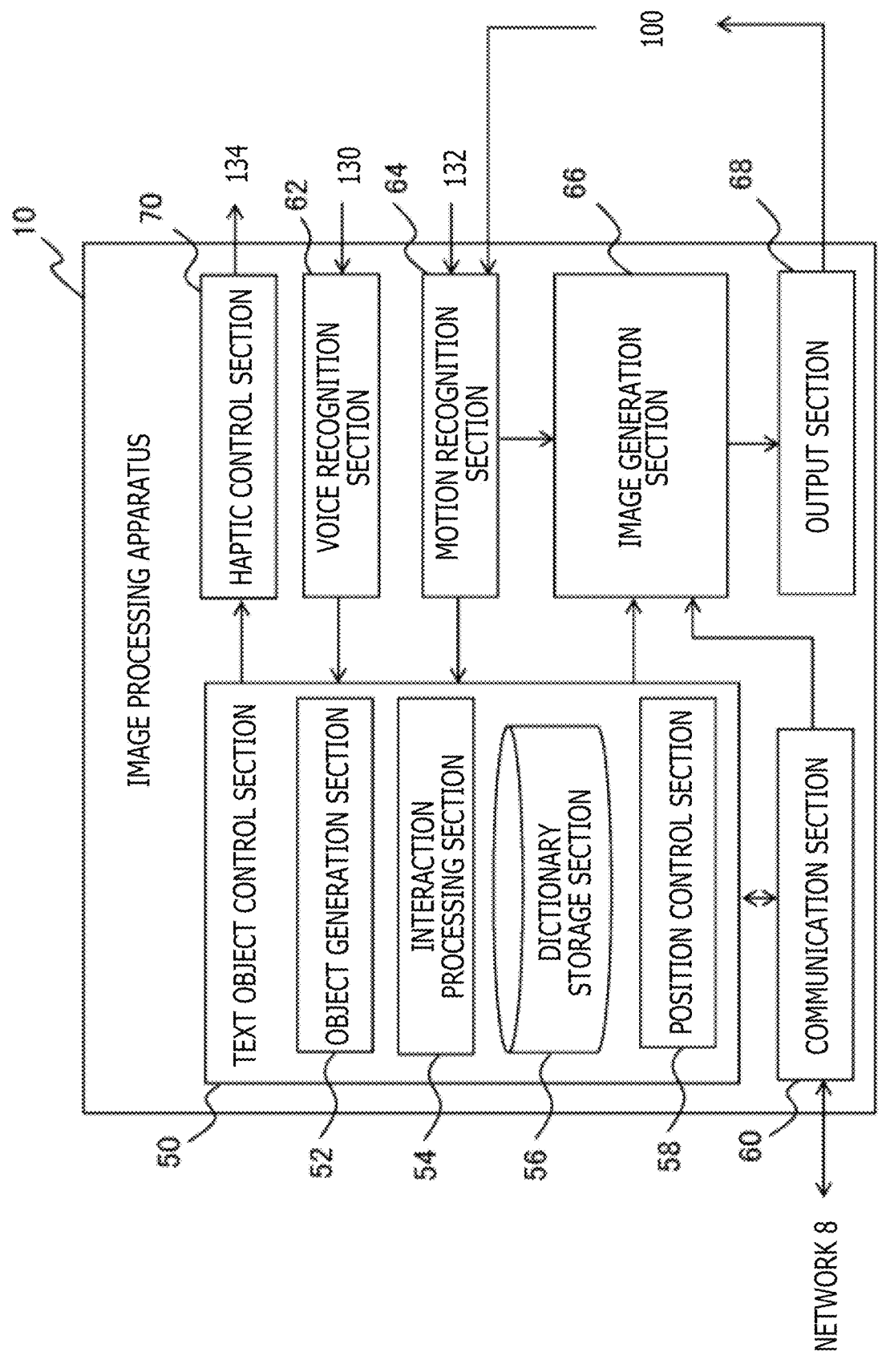

FIG. 7A
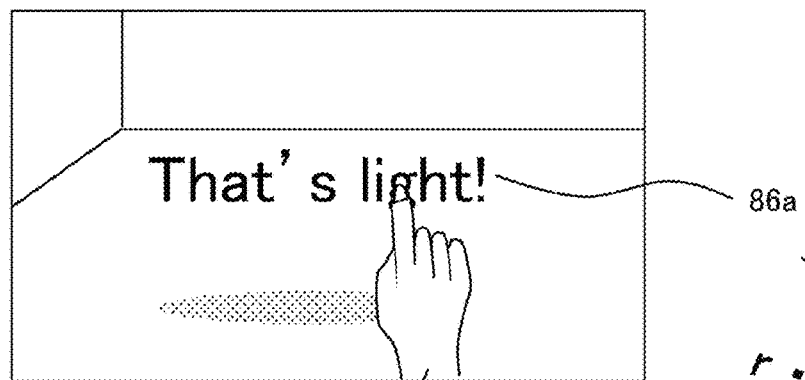
FIG. 7B ⇩
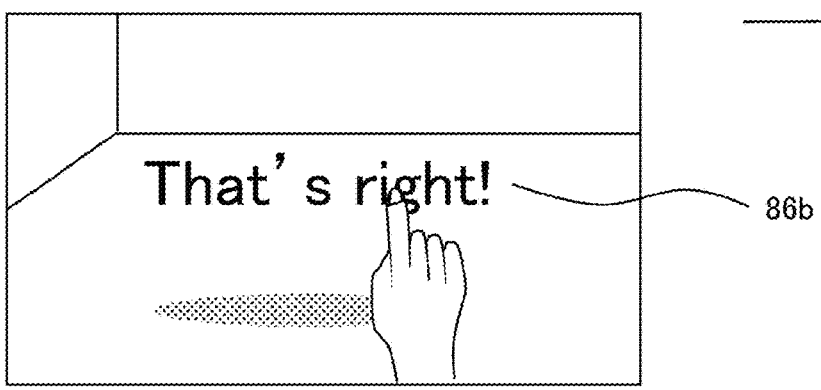
FIG. 8A  FIG. 8B
 

IMAGE PROCESSING APPARATUS AND IMAGE PROCESSING METHOD

CROSS REFERENCE TO RELATED APPLICATION

This application claims the benefit of Japanese Priority Patent Application JP 2019-117482 filed Jun. 25, 2019, the entire contents of which are incorporated herein by reference.

BACKGROUND

The present disclosure relates to an image processing apparatus and an image processing method that implement a user interface for text input.

Electronic content, such as videos and games, can be casually enjoyed in various forms due to an advanced image processing technology and an expanded network environment. When, for example, a panoramic image is displayed in a field of view corresponding to the orientation of the face of a user wearing a head-mounted display, it is possible to enhance the sense of immersion in a world of video and improve the operability of applications such as games. Further, when various wearable displays are used to combine an appropriately-positioned virtual object with a real-time video image captured in the field of view of the user or with a real image transmitted through eyeglasses worn by the user, it is also possible to merge the real world with the virtual world.

SUMMARY

Even when image representations are diversified as described above, text input is still necessary in various situations where, for example, users converse with each other through a network or upload an article to a network space. However, it is difficult to use a keyboard or other mechanical input apparatus in some cases where a user wears the above-described display that obstructs at least a part of the field of vision of the user. This difficulty may be addressed by displaying a virtual keyboard on screen. However, the virtual keyboard is not as easily handled as a real keyboard and is prone to erroneous recognition. Further, the mechanical appearance of the virtual keyboard may spoil an originally-presented world view of content.

The present disclosure has been made in view of the above circumstances. Therefore, it is desirable to provide a technology for inputting text reasonably and efficiently by using a display image.

An embodiment of the present disclosure relates to an image processing apparatus. The image processing apparatus includes a voice recognition section, a motion recognition section, a text object control section, and an image generation section. The voice recognition section recognizes a voice uttered by a user. The motion recognition section recognizes a motion of the user. The text object control section disposes an object of text representative of the contents of the voice in a three-dimensional virtual space, and varies the text by implementing interaction based on the motion. The image generation section displays an image with a virtual space projected thereon.

Another embodiment the present disclosure relates to an image processing method used by an image processing apparatus. The image processing method includes: recognizing a voice uttered by a user; recognizing a motion of the user; disposing an object of text representative of the contents of the voice in a three-dimensional virtual space; causing a display apparatus to display an image with the three-dimensional virtual space projected thereon; and varying the text by implementing interaction with the object in accordance with the motion.

Any combinations of the above components and any conversions of expressions of the present disclosure, for example, between methods, apparatuses, systems, computer programs, and recording media storing computer programs are also valid embodiments of the present disclosure.

According to the embodiment of the present disclosure, it is possible to input text reasonably and efficiently by using a display image.

BRIEF DESCRIPTION OF THE DRAWINGS

FIG. 5 is a diagram illustrating a configuration of functional blocks of the image processing apparatus according to the embodiment;

FIGS. 7A and 7B are diagrams illustrating example screens used in the embodiment to correct erroneously recognized text;

FIGS. 8A and 8B are diagrams illustrating a method used in the embodiment to apply a different correction by changing the orientation of a finger touching an object of text;

DETAILED DESCRIPTION OF THE PREFERRED EMBODIMENT

Figure 1:
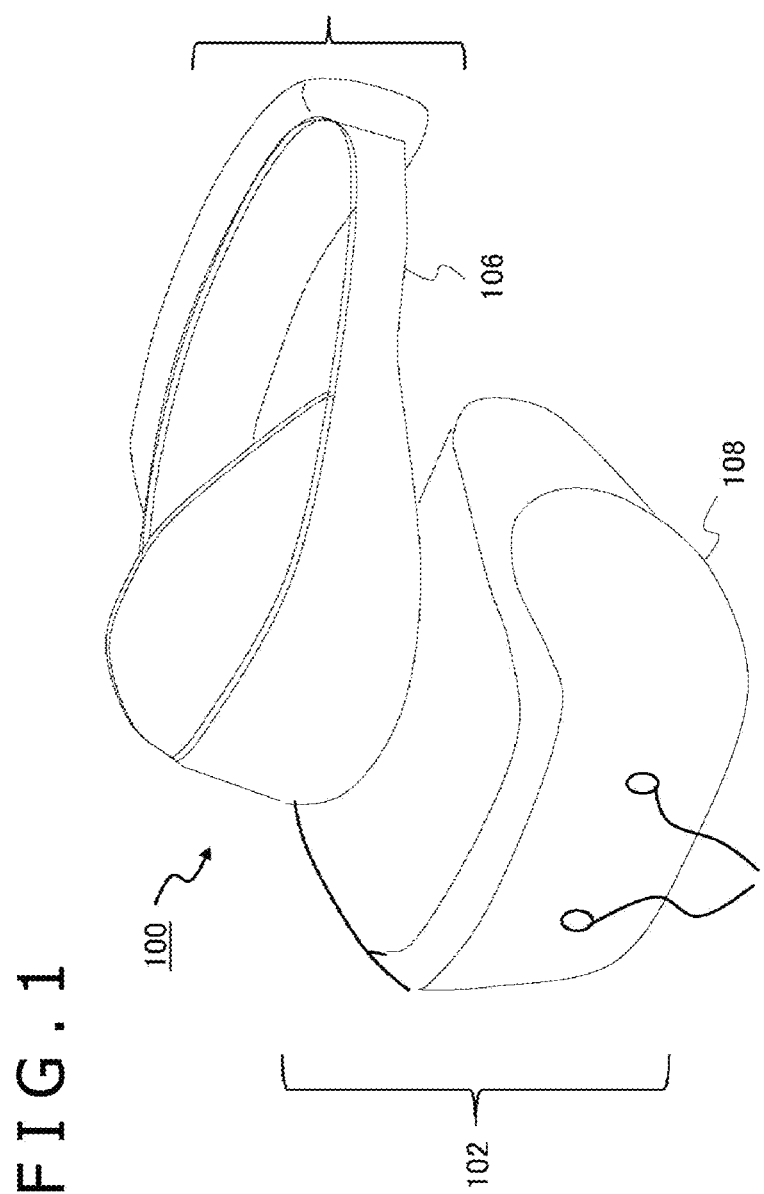
FIG. 1 is a diagram illustrating an example external view of a head-mounted display in an embodiment of the present disclosure.

An embodiment of the present disclosure will now be described with reference to the accompanying drawings. The present embodiment is applicable to a case where text is to be inputted in electronic content involving the display of images. As far as text is to be inputted in such electronic content, for example, the description of the content, the purpose of text input, and the form of a display apparatus are not particularly limited. An embodiment of displaying an image on a head-mounted display will be mainly described below as a typical example. FIG. 1 illustrates an example external view of a head-mounted display in the present embodiment. In the example of FIG. 1, the head-mounted display 100 includes an output mechanism section 102 and a mounting mechanism section 104. The mounting mechanism section 104 includes a mounting band 106. The mounting band 106 fastens the head-mounted display 100 to the whole circumference of the head of a user when the user wears the head-mounted display 100.

The output mechanism section 102 includes a housing 108 and a display panel. The housing 108 is shaped so as to cover the left and right eyes of the user when the user wears the head-mounted display 100. The display panel is disposed inside the housing 108 and adapted to face the eyes of the user when the user wears the head-mounted display 100. The housing 108 may further include an image-magnifying lens that is disposed between the display panel and the user's eyes when the user wears the head-mounted display 100. Stereo images corresponding to the parallax of the left and right eyes may be displayed in left and right separated regions of the display panel in order to provide a stereoscopic view.

The head-mounted display 100 may further include speakers or earphones that are positioned to match the user's ears. In the present example, the head-mounted display 100 includes a stereo camera 110 that is mounted on the front surface of the housing 108 to video a surrounding real space in the field of view corresponding to the user's gaze. Further, the head-mounted display 100 may include one of various sensors for deriving, for example, the motion, posture, and position of the head-mounted display 100, such as an acceleration sensor, a gyro sensor, or a geomagnetic sensor. The included sensor may be disposed inside or outside the housing 108.

Figure 2:
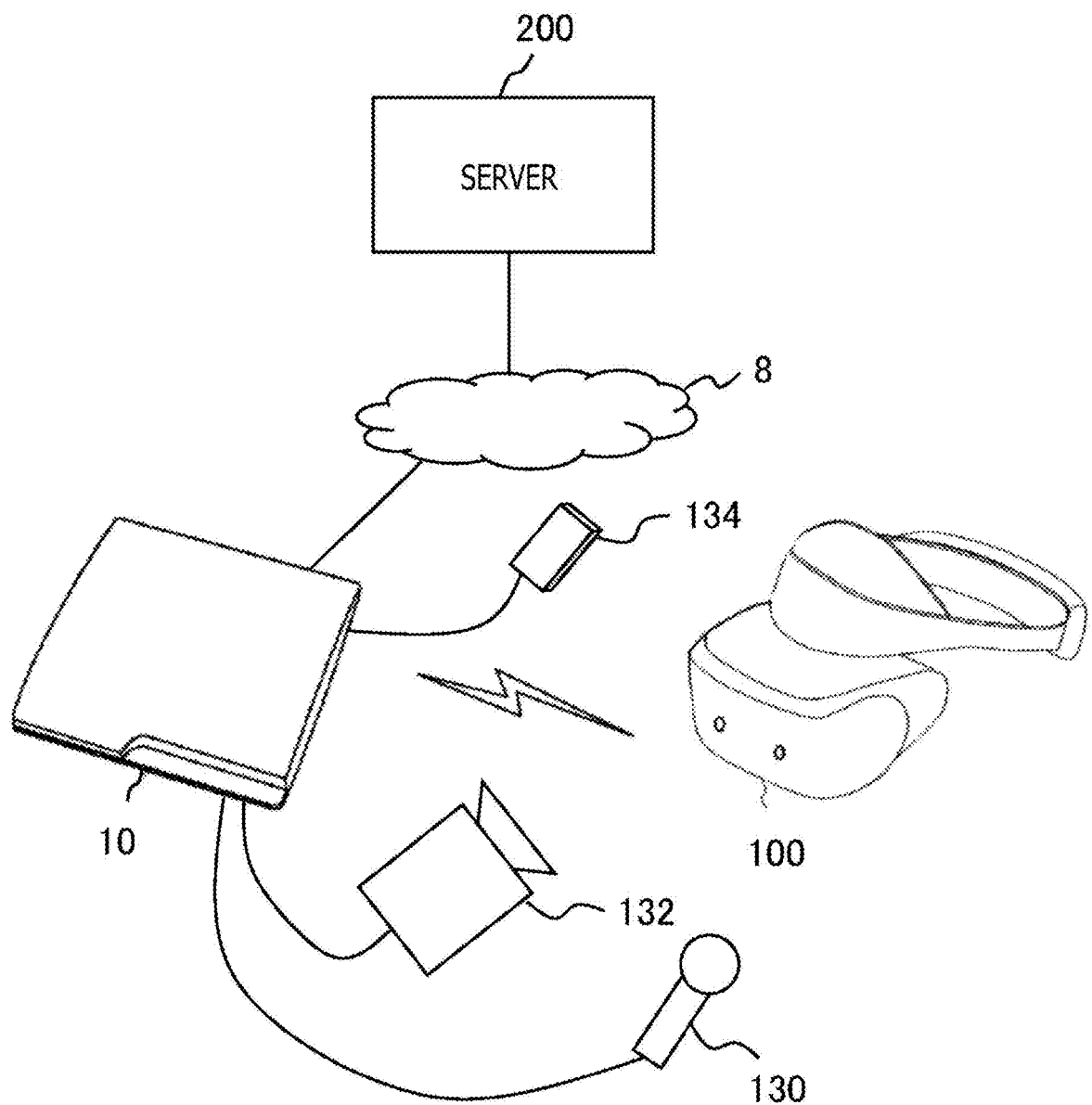
FIG. 2 is a diagram illustrating an example configuration of a content processing system to which the embodiment is applicable.

FIG. 2 illustrates an example configuration of a content processing system to which the embodiment is applicable. In the example of FIG. 2, the content processing system includes the head-mounted display 100, an image processing apparatus 10, a microphone 130, a camera 132, a haptic device 134, and a server 200. The head-mounted display 100 is connected to the image processing apparatus 10 through wireless communication. Alternatively, however, the head-mounted display 100 may be wiredly connected to the image processing apparatus 10, for example, through a universal serial bus (USB) connection. The microphone 130, the camera 132, and the haptic device 134 are also connected wiredly or wirelessly to the image processing apparatus 10.

The image processing apparatus 10 is connected to the server 200 through a network 8. The server 200 transmits, for example, electronic content data, such as videos and online games, to the image processing apparatus 10. The image processing apparatus 10 performs necessary processing on electronic content data transmitted from the server 200, and transmits the processed electronic content data to the head-mounted display 100. Alternatively, the image processing apparatus 10 may internally process the electronic content to generate image and voice data, and transmit the generated image and voice data to the head-mounted display 100.

Further, the image processing apparatus 10 receives text information inputted by the user wearing the head-mounted display 100, and transmits the received text information to the server 200 through the network 8. The image processing apparatus 10 may be disposed inside the head-mounted display 100. Further, as mentioned earlier, the apparatus for displaying a content image in the present embodiment is not limited to a head-mounted display, but may be, for example, a television receiver or other flat-panel display, a mobile terminal, or a projector.

When the head-mounted display 100 is adopted, the image processing apparatus 10 successively acquires, for example, the position and posture of the head of the user wearing the head-mounted display 100 in accordance, for instance, with values measured by a motion sensor built in the head-mounted display 100, and generates a display image in the corresponding field of view. A typical example of such a display technology may be a virtual reality (VR) technology for displaying an image of a three-dimensional space representative of a virtual world and a part of a captured panoramic image that corresponds to a user's field of view.

Furthermore, the image processing apparatus 10 may implement augmented reality (AR) by drawing a virtual object at an appropriate position within a real-time image captured by the stereo camera 110. Alternatively, the image processing apparatus 10 may reproduce, for example, a common movie or video in a fixed field of view without regard to the motion of the user's head. Forms of displaying such electronic content are common and will not be described in detail.

A situation where the user inputs text when, for instance, viewing electronic content will now be described. For example, in some cases where a single electronic game supplied from the server 200 is played by a plurality of players through the network 8, the players may converse with each other by using text as a medium. In such an instance, when, for example, one of the players inputs text and applies it to indicate his/her message, the inputted text is displayed and made visible to the other players as a message of an avatar existing in a virtual space that is a gaming field.

The above-mentioned communication through text messages is established not only during games but also during the use of a common social networking service (SNS). Further, text is also used, for example, to create an electronic mail message and a document and input a schedule. For example, a keyboard having an array of key switches or a keyboard application for displaying individual keys on a touch panel is commonly used as means of text input. However, such text input devices are difficult to handle in a case where the user wears the head-mounted display 100 or other display blocking the user's field of vision.

Moreover, even when the employed display does not block the user's field of vision, it is preferable that the user be enabled to input text easily and efficiently. In view of these circumstances, the present embodiment not only enables the user to input text (or a text string) by voice, but also displays the inputted text as an object in a virtual space and allows the user to directly handle the object representing the inputted text. Accordingly, the microphone 130 receives a voice uttered by the user and supplies a voice signal representative of the received voice to the image processing apparatus 10. The supplied voice signal is converted to text in the image processing apparatus 10 and displayed as an object.

The camera 132 supplies, to the image processing apparatus 10, real-time video data that is obtained by capturing at least a part of a user's body, such as a user's hand. Based on the supplied real-time video data, the image processing apparatus 10 acquires the motion and gesture of the user and detects an operation performed on the object of text. The image processing apparatus 10 then performs a process based on the detected operation, or more specifically, performs a process, for example, of correcting or deleting text, adding codes, and transmitting text information. The physical value of a target to be detected by the camera 132 is not particularly limited as far as the camera 132 is a visible-light camera, a stereo camera, a multispectral camera, a depth camera, or other camera capable of acquiring the position and posture of a subject on a frame-by-frame basis. Further, one of the above-mentioned cameras or a combination of two or more of them may be adopted.

The haptic device 134 conveys vibration or other haptic information when the user wears the haptic device 134. For example, while a user's finger is placed in contact with the object of text, the image processing apparatus 10 provides a simulated feel to a user's fingertip through the haptic device 134. Meanwhile, in a case where the correction of text varies from one gesture to another, the vibration and feel to be provided to the user by the image processing apparatus 10 vary with the gesture. These features not only enable the user to visually and haptically perceive that the user is touching the object of text, but also enable the user to haptically confirm what correction is recognized. The haptic device 134 may adopt any of implemented common structures.

The shapes of the microphone 130, camera 132, and haptic device 134 are not limited to those depicted. For example, the microphone 130 may be a part of the head-mounted display 100 or disposed integrally with the camera 132. Further, a motion sensor for detecting the motion of user's fingers when worn by the user, such as a VR glove, may be adopted in replacement of the camera 132. When the VR glove is adopted, the haptic device 134 may be attached, for example, to a fingertip of the VR glove. Moreover, the stereo camera 110 on the head-mounted display 100 may function as the camera 132.

Figure 3:
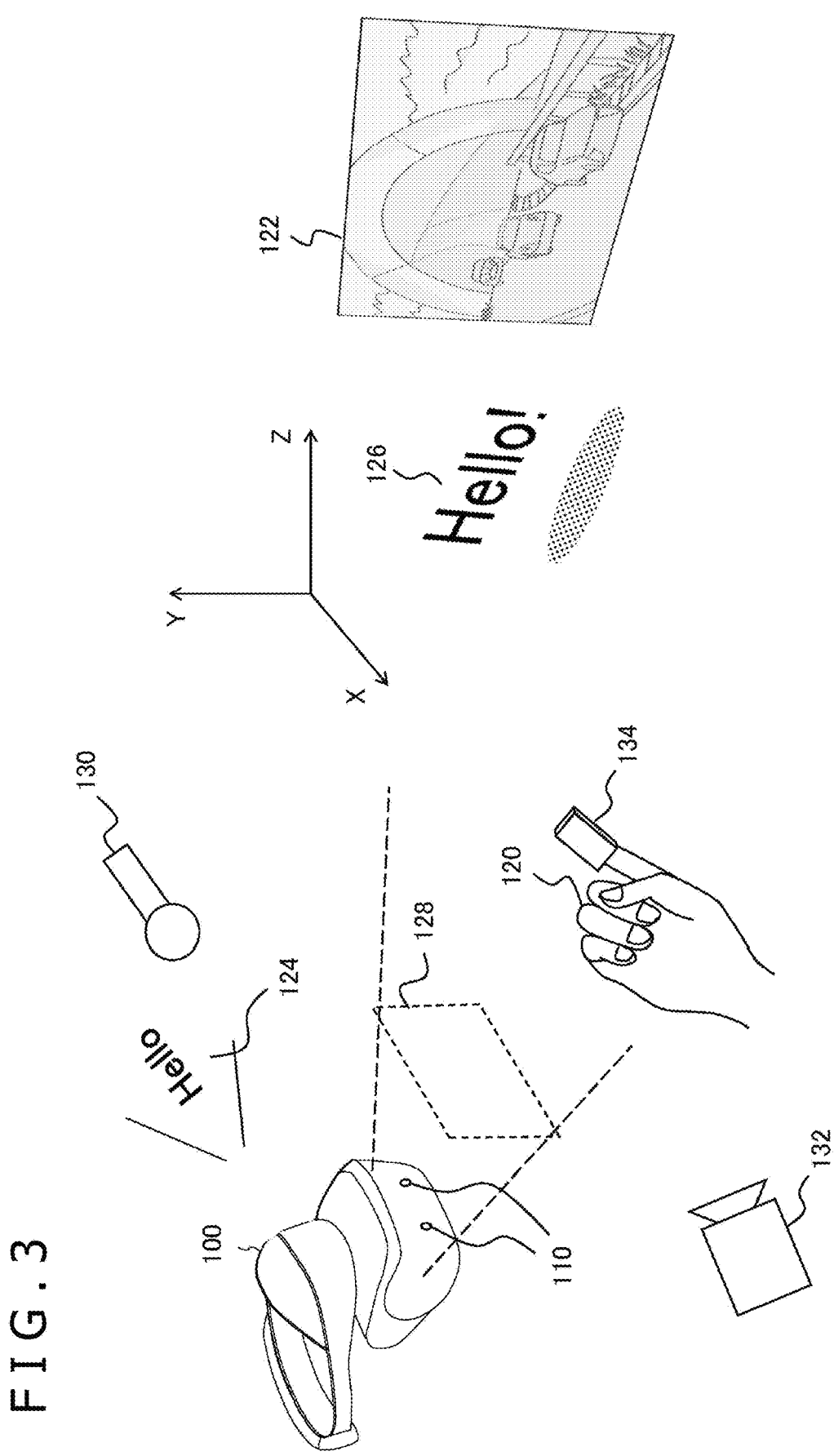
FIG. 3 is a schematic diagram illustrating a display form in the embodiment.

FIG. 3 schematically illustrates a display form in the present embodiment. The rightward direction in FIG. 3 represents the depth direction (Z-axis) from the user. Under normal conditions, the user wears the head-mounted display 100 to view an image 122 of content. As mentioned earlier, the image 122 may be a planar image or stereoscopic video. Further, the image 122 may be a reproduction of an originally generated image or may include a real-time image that is being captured by the stereo camera 110.

At a time point for inputting text, the microphone 130 acquires a voice uttered by the user, and transmits the acquired voice to the image processing apparatus 10 as a voice signal. The image processing apparatus 10 converts the voice signal to text, and disposes the text as an object in a virtual three-dimensional space to be displayed. In the illustrated example, in response to the uttered voice 124 saying "Hello," an object 126 of text is obtained by converting the uttered voice 124 and disposed in a three-dimensional space.

The object 126 is projected onto a view screen 128 corresponding to the field of view of the head-mounted display 100 and displayed on the head-mounted display 100. Then, it looks to the user as if a word uttered by the user is floating before the eyes of the user. In the illustrated example, a space where the object 126 of text exists is separate from the originally displayed image 122 of content. However, when the image 122 of content represents the result of projection of a three-dimensional space, the object 126 of text may be disposed in the same space as the content.

In the above case, the word uttered by the user is floating in a world of content. In such a state, the camera 132 and the stereo camera 110 capture an image, for example, of a user's hand and supplies the captured image to the image processing apparatus 10. The microphone 130 continues to transmit a signal of the voice uttered by the user to the image processing apparatus 10. When predetermined conditions are satisfied by the motion, gesture, or voice of the user or by a combination of them, the image processing apparatus 10 performs a corresponding process.

When, for example, a hand 120 makes a predetermined gesture between uttered words or at the end of a sentence, a corresponding code is added to the object 126 of text. In the illustrated example, when an index finger of the hand 120 is raised after the voice 124 saying "Hello" is uttered, the image processing apparatus 10 adds an exclamation mark to the end of the object 126 of "Hello." The exclamation mark is associated with the gesture of raising an index finger. Further, interaction between the user and text is implemented by enabling the user to touch the object 126 of text in the virtual world.

For example, the image processing apparatus 10 confirms the coincidence between the position of a hand in a real world and the position of the object 126 in the virtual world in order to detect a state where a certain letter within a sentence having a plurality of words is touched by the user. In this instance, the image processing apparatus 10 may, for example, vibrate the haptic device 134 in order to stimulate the haptic sense of the user so that the user feels as if the user touches the object. Then, for example, the associated letter or a word containing the associated letter is corrected in accordance with a voice uttered or a gesture made in a state where the object of text is touched.

Corrections are made not only by correcting or deleting an erroneous recognition, but also by switching between upper-case and lowercase letters, changing the type of letters by switching between kanji, hiragana, and katakana letters, correcting misspelled words, or correcting a notational error by switching, for example, between homonyms. In any case, a portion of the object 126 of text that is touched by the user can be designated as a correction target. Therefore, only a relevant portion can be efficiently corrected without having to take the trouble of saying a word all over again.

Further, the above-mentioned wide variety of corrections can be identified by using variations of an object handling method, such as touching, pinching, and turning over, or by using variations of the finger to be used. This makes it possible to input text easily and efficiently without having to use, for example, a keyboard. In a case where various operations are to be recognized by using the above-mentioned variations, the image processing apparatus 10 may convey a vibration or haptic sensation based on a recognized operation to the user through the haptic device 134 as described earlier. This makes it possible to create a haptic sensation so that the user feels as if the user selectively uses function keys on a keyboard.

Figure 4:
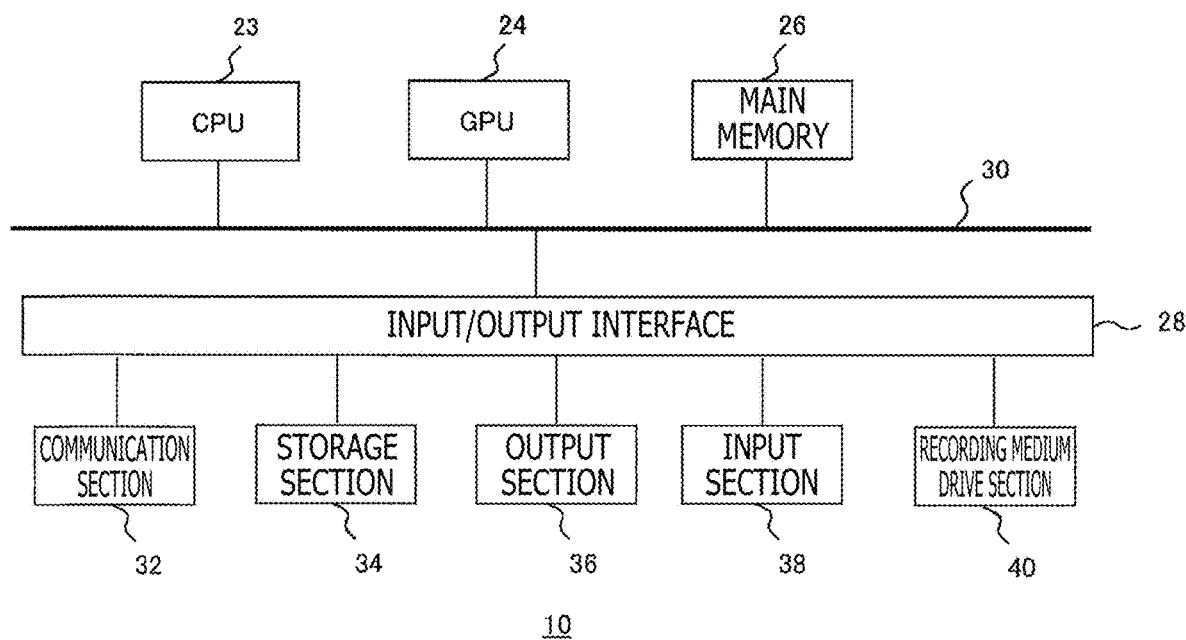
FIG. 4 is a diagram illustrating an internal circuit configuration of an image processing apparatus according to the embodiment.

FIG. 4 illustrates an internal circuit configuration of the image processing apparatus 10. The image processing apparatus 10 includes a central processing unit (CPU) 23, a graphics processing unit (GPU) 24, and a main memory 26. These components are interconnected through a bus 30. The bus 30 is further connected to an input/output interface 28.

The input/output interface 28 is connected to a communication section 32, a storage section 34, an output section 36, an input section 38, and a recording medium drive section 40. The communication section 32 includes a USB, Institute of Electrical and Electronic Engineers (IEEE) 1394, or other peripheral device interface or a wired or wireless local area network (LAN) network interface, and establishes communication with the server 200 and the head-mounted display 100. The storage section 34 is, for example, a hard disk drive or a nonvolatile memory. The output section 36 outputs data to the head-mounted display 100 and the haptic device 134. The input section 38 inputs data, for example, from the head-mounted display 100, the microphone 130, and the camera 132. The recording medium drive section 40 drives a magnetic disk, an optical disk, a semiconductor memory, or other removable recording medium.

The CPU 23 provides overall control of the image processing apparatus 10 by executing an operating system stored in the storage section 34. Further, the CPU 23 executes various programs read from the removable recording medium and loaded into the main memory 26 or various programs downloaded through the communication section 32. The GPU 24 functions as a geometry engine and as a rendering processor, performs a drawing process in accordance with a drawing command from the CPU 23, and outputs the result of the drawing process to the output section 36. The main memory 26 includes a random-access memory (RAM) and stores programs and data necessary for processing. Text information inputted in the present embodiment is stored in the main memory 26 in response to a user operation or at a predetermined time point.

FIG. 5 illustrates a configuration of functional blocks of the image processing apparatus 10. The functional blocks depicted in FIG. 5 can be implemented by hardware such as the CPU, the GPU, or the memory, and can be implemented by software including programs loaded into the memory from a recording medium in order to exercise various functions such as an information processing function, an image drawing function, a data input/output function, and a communication function. Therefore, it will be understood by those skilled in the art that the functional blocks can be variously implemented by hardware alone, by software alone, or by a combination of hardware and software and are not restrictively implemented by any one of them.

The image processing apparatus 10 includes a voice recognition section 62, a motion recognition section 64, an image generation section 66, an output section 68, a text object control section 50, a communication section 60, and a haptic control section 70. The voice recognition section 62 recognizes the voice of the user and converts the recognized voice to text information. The motion recognition section 64 recognizes the motion and gesture of the user. The image generation section 66 generates a display image. The output section 68 outputs display image data to the head-mounted display 100. The text object control section 50 implements interaction with the user by disposing an object of text in a three-dimensional virtual space. The communication section 60 communicates with another apparatus through the network 8. The haptic control section 70 applies a haptic stimulus to the user through the haptic device 134.

The voice recognition section 62 acquires, from the microphone 130, a signal of the voice uttered by the user, and converts the acquired voice signal to text. Any of various implemented technologies may be applied to a voice recognition process that is performed in the voice recognition section 62. The motion recognition section 64 acquires a captured image of the user and a sensor value from at least one of the camera 132 and the head-mounted display 100, and recognizes the motion and gesture of the user. Alternatively, the motion recognition section 64 may recognize the motion and gesture of the user by acquiring a value measured by a sensor worn by the user. Any of various implemented technologies may also be applied to a motion/gesture recognition process that is performed in the motion recognition section 64.

The image generation section 66 generates an image of content that is to be displayed on the head-mounted display 100. For example, the image generation section 66 receives compression-encoded video data acquired by the communication section 60, and reproduces the compression-encoded video data by decoding and decompressing it. Alternatively, the image generation section 66 may process an electronic game so as to draw its image. The image generation section 66 may generate an image of aforementioned VR or AR. Further, during a period when text input is required, the image generation section 66 causes a display image to include an object of text by projecting a virtual space built by the text object control section 50 onto a view screen corresponding to the field of view of the head-mounted display 100.

As described above, in a case where a virtual space is built within content, the text object control section 50 should project both an object of text disposed in the virtual space and an object of the content onto the view screen. The output section 68 outputs the display image data generated by the image generation section 66 to the head-mounted display 100. The output section 68 may parallelly output voice data included in content data. However, a voice-related process is not depicted in FIG. 5.

The text object control section 50 disposes an object of text representative of the contents of a voice in accordance, for example, with the result of voice recognition by the voice recognition section 62, implements virtual interaction based on the motion of the user, and varies the text in accordance with the result of virtual interaction implementation. Therefore, the text object control section 50 presents an image of a user's hand in the virtual space in order to visually express interaction with the object of text.

Particularly, the text object control section 50 includes an object generation section 52, an interaction processing section 54, a dictionary storage section 56, and a position control section 58. The object generation section 52 acquires text information derived from voice conversion by the voice recognition section 62, and disposes the acquired text information as an object in the virtual space. Accordingly, the object generation section 52 internally retains setup information such as the font, color, size, and position of text to be presented as an object. The object of text may be a three-dimensional object having a thickness.

Further, in accordance with the gesture and voice of the user, the object generation section 52 generates an object, for example, of a code or an emoticon that are not directly derived from a voice, and presents the generated object in the virtual space. Accordingly, the object generation section 52 internally retains setup information indicating the correspondence between codes and emoticons and the gestures and voices for inputting the codes and emoticons. Moreover, in accordance with the gesture, for example, of a user's hand that is made simultaneously with the utterance of a user's voice, the object generation section 52 may determine the type of text to be generated.

If, for example, three fingers are simultaneously raised when a voice saying "Hello" is uttered in the example of FIG. 3, an object of text is generated by using katakana letters instead of alphabetical letters. In this case, even if the voice recognition section 62 generates text information by using alphabetical letters, an object of katakana letters is generated by initially correcting the generated alphabetical text information. The object generation section 52 may generate an object of text that represents only the voice uttered by the user while the user is making a predetermined gesture.

When, for example, only a voice uttered by the user while the hands of the user are cupped like a megaphone and disposed at the left and right ends of a user's mouth is presented as an object of text, it is possible to prevent, for example, a soliloquy from being unintentionally converted to text. The interaction processing section 54 corrects an object of text in accordance with the motion and voice of the user with respect to an object of text presented in a three-dimensional virtual space. Accordingly, the interaction processing section 54 presents an image of the user's hands in a virtual space to create a state where the user is visually touching the object of text.

As far as the actual motion of the user's hands can be reflected in real time, the image of the user's hands may be an image actually captured, for example, by the stereo camera 110 on the head-mounted display 100 or an image drawn by computer graphics. In any case, when the user reaches for a place corresponding to the position of the object of text disposed by the object generation section 52, the object generation section 52 detects that the text is touched by the user.

Subsequently, a touched letter or a word containing the touched letter is corrected in accordance with an instruction uttered by the user while the user is touching the object of text to be corrected or in accordance with a user's motion of pinching or turning over the object. The correction to be made may be changed in accordance with the combination of fingers used to pitch the object of text. Further, the correction to be made may be changed depending on whether the object of text is touched by the ball or the back of the finger.

The dictionary storage section 56 stores a dictionary defining the letters and their priority levels that are to be used when the object generation section 52 generates an object of text and when the interaction processing section 54 corrects an object of text. For example, the dictionary storage section 56 stores, on an individual word basis, notational variations including the types of letters, such as kanji, hiragana, katakana, and alphabetical letters, the details of kanji letters, and the spelling of alphabetical letters, and their priority levels.

The priority levels are continuously optimized based on the frequency of use by successively performing an update in accordance with the result of previous text object generation by the object generation section 52 and with the result of previous text object correction by the interaction processing section 54. At least some of the words in the dictionary stored in the dictionary storage section 56 may retain different priority levels regarding different pieces of content that was reproduced simultaneously with voice input.

For example, in a case where a concert video of a band having a name containing letters generally low in priority level or infrequently used letters is reproduced, high conversion accuracy can be achieved by initially raising the priority levels of such letters used in relevant conversations. When the priority levels for different pieces of content are retained, it is possible to instantly perform conversion to letters suitable for simultaneously reproduced content and prevent a special result of learning of previous content from being reflected during the reproduction of different content.

In a case where text is input for the purpose of communicating with another user not only in simultaneously reproduced content but also in a community engaged to talk about a specific topic, different priority levels may be retained for different communities. In such a case, the priority levels are learned based on the result of previous text conversion by members belonging to a community and then shared by the members. In this instance, too, text can be efficiently converted according to a priority level conforming to the community.

In order to indicate that a certain process is performed on the whole text information, the position control section 58 moves an object of text that is disposed in a virtual space by the object generation section 52. For example, in a case where an operation is performed to transmit a completed sentence, for example, to a conversation partner or a game space through the network 8 as a result of text object generation or correction, the interaction processing section 54 first detects such an operation. For example, a sound made by the user blowing on the object of text is detected as a transmission operation by the interaction processing section 54.

Consequently, it is possible to create a situation where the completed sentence looks like being blown away by the user. For example, a voice saying "Transmit," a hand clapping sound or operation, or an operation performed to move a hand to sweep off a text object may be detected as a transmission operation. Upon detecting a transmission operation, the interaction processing section 54 reports the detected transmission operation to the position control section 58 and the communication section 60. In response to such a report, the position control section 58 moves the text object away from the user within a virtual space.

A transmission may be canceled by leaving an object representing a transmitted sentence at a remote place without deleting it from the virtual space and then pulling it back. For example, in a case where an error is found in a transmitted sentence, the user may reach for an object of a target left at a remote place, pull it back toward the user, correct it, and retransmit it. Alternatively, when a message is to be canceled, the sentence pulled back may be deleted. These operations are detected by the interaction processing section 54 and reported to the position control section 58 and the communication section 60 so as to perform, as needed, an object movement process or a transmission cancellation process.

The communication section 60 establishes communication with another apparatus, such as the server 200, through the network 8, acquires content data, and supplies the content data to the image generation section 66. Further, the communication section 60 transmits text information, such as information about a sentence completed by using an object of text, to another apparatus in accordance with a user's transmission operation. For example, the communication section 60 acquires an image of an online game that is stream-transferred by a game server and played by a plurality of players. In such an instance, messages of other players are acquired as needed. A sentence inputted from a user's apparatus is then transmitted to the game server.

Accordingly, the players are able to communicate with each other within a game space. Further, when the interaction processing section 54 informs the communication section 60 that an operation is performed to cancel transmitted text information, the communication section 60 performs a transmission cancellation process by transmitting necessary information to a destination. Moreover, the communication section 60 acquires, as needed, information about the priority levels of text conversion targets, which should be shared by members participating in a community, and stores the acquired information in the dictionary storage section 56.

The haptic control section 70 controls the haptic device 134 in such a manner that the user is given a haptic stimulus corresponding to a user's motion with respect to a text object. For example, as mentioned above, the haptic control section 70 haptically creates a state where the text object is touched by the user. Alternatively, when the text object is to be operated by using the gesture or motion of the user, the user is given a haptic stimulus varying from one operation to another so as to enable the user to confirm the type of operation that the user's motion or gesture corresponds to.

Figure 6A:
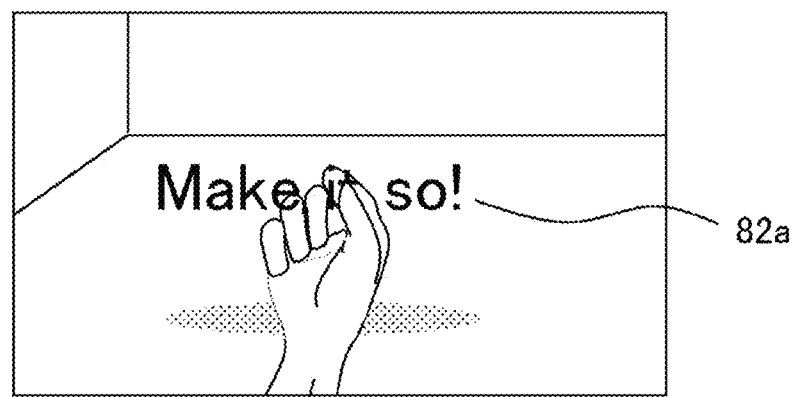
FIGS. 6A and 6B are diagrams illustrating example screens used in the embodiment to correct the type of text by moving a hand.
Figure 6B:
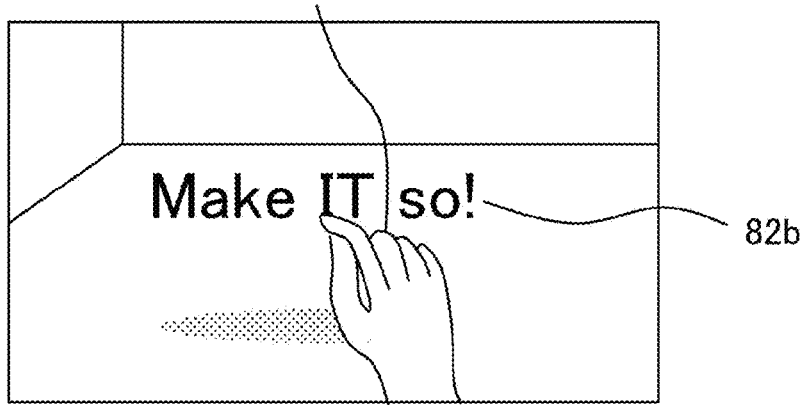

FIGS. 6A and 6B illustrate example screens that are used when an operation is performed by a hand to correct the type of letters. An object 82a of a text string saying "Make it so!" is displayed on a screen depicted in FIG. 6A. This signifies, as mentioned earlier, that an object of text generated in a virtual space by the text object control section 50 in accordance with a voice uttered by the user or a gesture of the user is projected onto the view screen by the image generation section 66. Another object may exist in the virtual space, and the virtual space may be commonly used by content. Further, the screen may separately display the contents of a conversation including a message of a conversation partner.

The interaction processing section 54 presents a hand image 84 in the virtual space. An actual hand of the user is reflected in real time by the hand image 84. When, in this instance, the lowercase word "it" is to be corrected to the uppercase word "IT," the user pinches the word "it" within the text string object 82a and turns the word over as depicted in FIGS. 6A and 6B. The interaction processing section 54 then detects such a user's motion, and presents an object 82b indicating that the pinched portion is changed to the word "IT" as depicted in FIG. 6B. More specifically, the interaction processing section 54 rotates the object in accordance with a user's hand motion for turning the object over, and changes the word from lowercase to uppercase at a predetermined time point during rotation.

In order to implement such a correction operation, the interaction processing section 54 sets information for associating an operation of turning a text object over with a lowercase-to-uppercase conversion process. The same is true for operations illustrated below. The same operation may be performed to switch between two types of letters including switching between hiragana and katakana letters and switching between alphabetical and hiragana letters in addition to switching between lowercase and uppercase letters. Meanwhile, when a text object is to be pinched as depicted in FIG. 6A, corrected letters may be changed by using a different combination of fingers for pinching. For example, using a thumb and an index finger for pinching as depicted in FIGS. 6A and 6B may change the letters to uppercase letters, using the thumb and a middle finger for pinching may change the letters to hiragana letters, and using the thumb and a little finger for pinching may change the letters to katakana letters.

Alternatively, when a voice saying "Convert" is detected instead of a turning-over operation in a state where a text object is pinched or touched as depicted in FIG. 6A, the letters may be corrected to a different type of letters. In such a case, a voice saying, for example, "Convert to uppercase" may be uttered to specify the type of corrected letters. Further, the type of corrected letters may be specified for correction purposes by changing the formation of fingers after touching a text object.

FIGS. 7A and 7B illustrate example screens that are used to correct erroneously recognized text. An object 86a of a text string saying "That's light!" is displayed on a screen depicted in FIG. 7A. When the user utters a voice "r, i, g, h, t" to specify the spelling of the text string in response to the text displayed on the screen as depicted in the right of FIG. 7A, the interaction processing section 54 recognizes the uttered voice, and presents an object 86b indicating that the spelling of the object "light" is corrected to "right" as depicted in FIG. 7B.

As described above, corrections may be made on an individual word basis or on an individual letter basis. In any case, only a part of a text object can be freely corrected in accordance with a voice uttered while a portion to be corrected is touched. In addition to making a correction by sequentially saying alphabetical letters of the text object as depicted in FIGS. 7A and 7B, an erroneous recognition may be corrected by saying a phrase again.

FIGS. 8A and 8B illustrating a method of applying a different correction by changing the orientation of a finger touching a text object. FIGS. 8A and 8B depict only a text object and a hand image by extracting them from the screens depicted in FIGS. 6A, 6B, 7A, and 7B. As is the case with the correction made from FIG. 7A to FIG. 7B, FIG. 8A depicts a state where "light" is corrected to "right" when the user utters a voice to indicate a correct spelling while touching the object of "light." It can be said that this correction is made by uttering a voice so as to overwrite the touched letters.

In the depicted example, the interaction processing section 54 detects that the text object is touched by the ball of the finger, and determines that an overwrite operation is performed. Meanwhile, in a case where the text object is touched by the back of a finger (a fingernail side) as depicted in FIG. 8B, the interaction processing section 54 determines that an operation is performed to insert text before the touched word. In the depicted example, an object of "all" is inserted before an object of "right" when a voice saying "all" is uttered while the object of "right" in a state depicted in FIG. 8A is touched by the back of a finger.

Difference in the orientation of a finger touching a text object can be used not only for switching between overwrite and insert but also for changing the type of corrected letters, such as determining whether alphabetical letters are to be replaced by hiragana or katakana letters. When a multispectral camera is adopted as the camera 132, the orientation of a finger can be accurately recognized from an image captured by the multispectral camera. Even when a visible-light camera is used, the orientation of a finger can be identified by checking the color, shape, and other features of the finger to determine the apparent presence of a fingernail. In such an instance, the accuracy of orientation identification may be improved by conducting deep learning to optimize the relationship between features in captured images and the orientation of a finger.

Figure 9A:
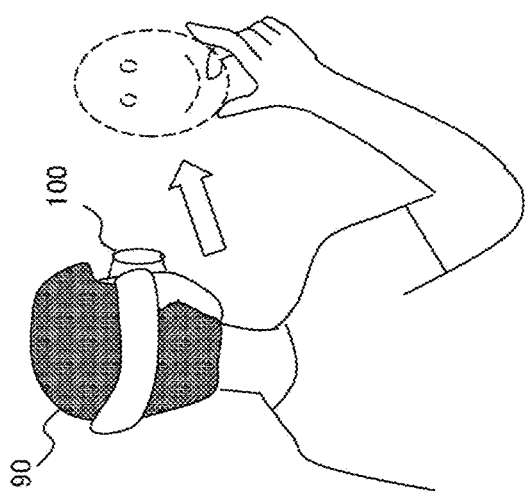
FIGS. 9A and 9B are diagrams illustrating, as input means other than voice, an example method of inputting an emoticon by making a gesture.
Figure 9B:
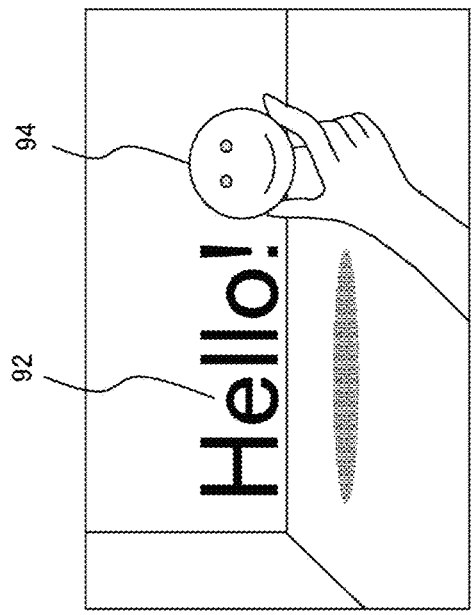

FIGS. 9A and 9B illustrate, as input means other than voice, an example method of inputting an emoticon by making a gesture. As depicted in FIG. 9A, a user 90 wears the head-mounted display 100 and is viewing a screen including a text object depicted thus far. When, in this instance, the user 90 makes a gesture of moving the face of the user 90 into a virtual space, the interaction processing section 54 detects the gesture, and presents an object of an emoticon in such a manner as if the user's face is disposed in the virtual space.

In the example of FIG. 9A, the user 90 pinches the vicinity of a user's chin between a thumb and an index finger, and moves the chin forward in a simulated manner of removing a mask. A space where a text object exists is virtually disposed in front of the user 90. Therefore, when a user's hand is moved and placed in front of the view screen, the interaction processing section 54 causes the object of the emoticon to appear in the virtual space. Subsequently, when the user moves to position the object of the emoticon near a currently corrected text object 92, the emoticon object 94 is added to the text object 92 as depicted in FIG. 9B.

FIG. 9B depicts a state where the object 94 of a smiling emoticon is added to the end of the existing text object 92 of "Hello!" In this case, the facial expression of the emoticon may reflect the facial expression of the user 90 at the beginning of a gesture for adding the emoticon. In such an instance, the motion recognition section 64 performs facial expression recognition and emotion recognition on a captured image of the face of the user 90, and identifies the facial expression of the user 90 by determining whether it falls into a category of laughter, cry, or anger. A camera for capturing an image of the eyes of the user 90 may be incorporated into the head-mounted display 100 in order to recognize the emotion, for example, from the shape of the eyes.

Various other methods are available for facial expression recognition and emotion recognition. Any of such methods may be adopted. Based on the result of such recognition, the interaction processing section 54 determines the facial expression of the emoticon. Further, the facial expression of the added emoticon may be corrected later. In this case, too, when the category of facial expression is specified, for example, by a voice while the emoticon object 94 is touched, the interaction processing section 54 detects the voice and corrects the facial expression, as is the case with text correction.

Alternatively, the facial expression may be changed by pinching the emoticon object 94 and turning it over. Further, a changed facial expression may be switched to a different one by using a different combination of fingers for pinching. The changed facial expression may be switched to a different one by selectively using the ball or back of a finger for touching. Voices and gestures are separately associated with emoticons and with, for example, codes inexpressible by ordinary utterance in order to allow the interaction processing section 54 to detect such voices and gestures and present them as objects.

When gestures are to be used, associating a code with a gesture highly relevant to the meaning of the code makes it possible to perform an easy-to-remember intuitive operation. For example, when a gesture of hitting something with a fist is associated with the input of a period, the meaning of the gesture is easily understood because the gesture is readily associated with stamping at the end of a sentence. Further, a gesture of clapping hands may be used to input an exclamation mark, and a gesturing of tilting a head may be used to input a question mark. When a voice is to be used, the name of a code, such as "Exclamation mark" or "Question mark," may be uttered.

Deleting an inputted letter can also be made easy by using a gesture. For example, a letter or a word may be deleted by sliding a finger two times over a relevant object in such a manner as to draw double strikethrough lines over the letter or word to be deleted. Alternatively, a gesture of pinching and flying an object of the letter or word to be deleted may be used as a deletion operation. Another alternative is to delete a letter or word when a voice saying "Delete" is uttered while an object of the letter or word is touched.

Figure 10A:
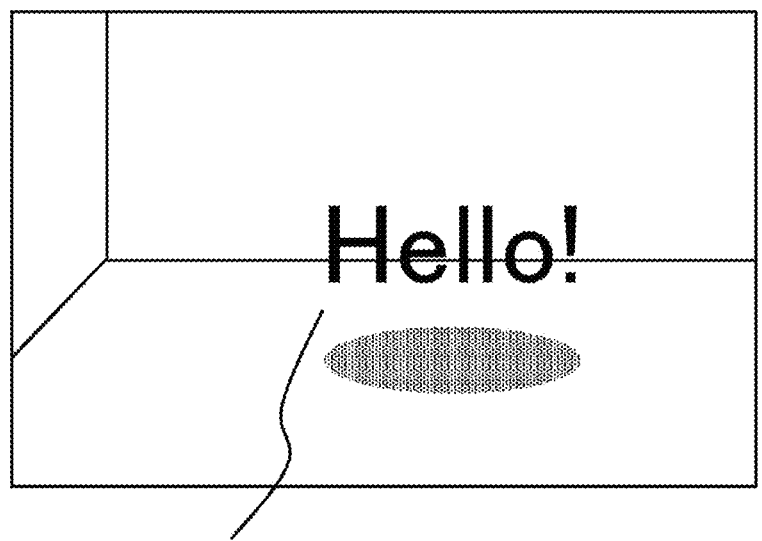
FIGS. 10A and 10B are diagrams illustrating a screen transition that occurs when inputted text information is transmitted.
Figure 10B:
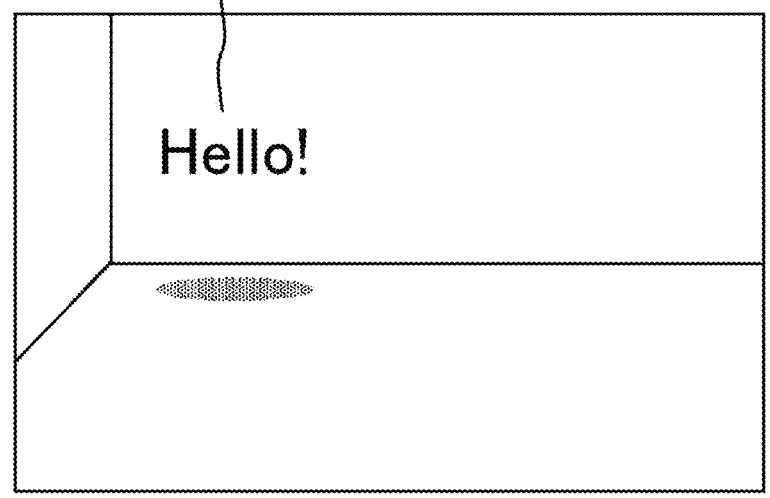

FIGS. 10A and 10B illustrate a screen transition that occurs when inputted text information is transmitted. A screen depicted in FIG. 10A indicates a state where an object 96 of text "Hello!" is completed as mentioned earlier. When, in this instance, the user utters a predetermined voice or makes a predetermined motion, such as blowing on the object, sweeping off the object, or saying "Transmit," the interaction processing section 54 detects such a voice or motion and requests the communication section 60 to transmit text information. The communication section 60 then handles the object "Hello!" as text data, and transmits the text data to the server 200 or other information processing apparatus of a communication partner.

Subsequently, the position control section 58 moves the text object 96 away from its original position as depicted in FIG. 10B in order to indicate that the text object 96 has been transmitted. In the depicted example, the text object is moved to the rear of the virtual space. When text is to be newly inputted, the object generation section 52 disposes a new text object in the front of the virtual space. This enables the user to identify the position of the new text object in the virtual space and thus determine whether a relevant text string is already transmitted or being prepared. If, in this instance, the user makes a motion of pulling the text object 96 back from the rear of the virtual space, the interaction processing section 54 detects the motion and interprets the detected motion as a transmission cancellation operation.

In the above instance, the position control section 58 moves the text object 96 to the front in such a manner as to follow the motion of a user's hand. In response to a transmission cancellation request from the interaction processing section 54, the communication section 60 accesses, for example, the server 200 and performs a procedure for transmission cancellation. In this case, a common procedure for deleting, for example, a post on an SNS may be used. The user may perform the above-mentioned correction or deletion operation on the pulled-back text object 96 and perform a transmission operation again as needed.

A motion of pulling a text object forward from the rear is readily associated with restoring abandoned text. Therefore, such a motion is readily understood when associated with a transmission cancellation operation. Consequently, an intuitive operation can be implemented. A method of indicating the state of whole text information by the position of a text object in a virtual space can be used to determine not only whether data is transmitted or not, but also whether, for example, a created sentence is stored in a storage apparatus.

Figure 11:
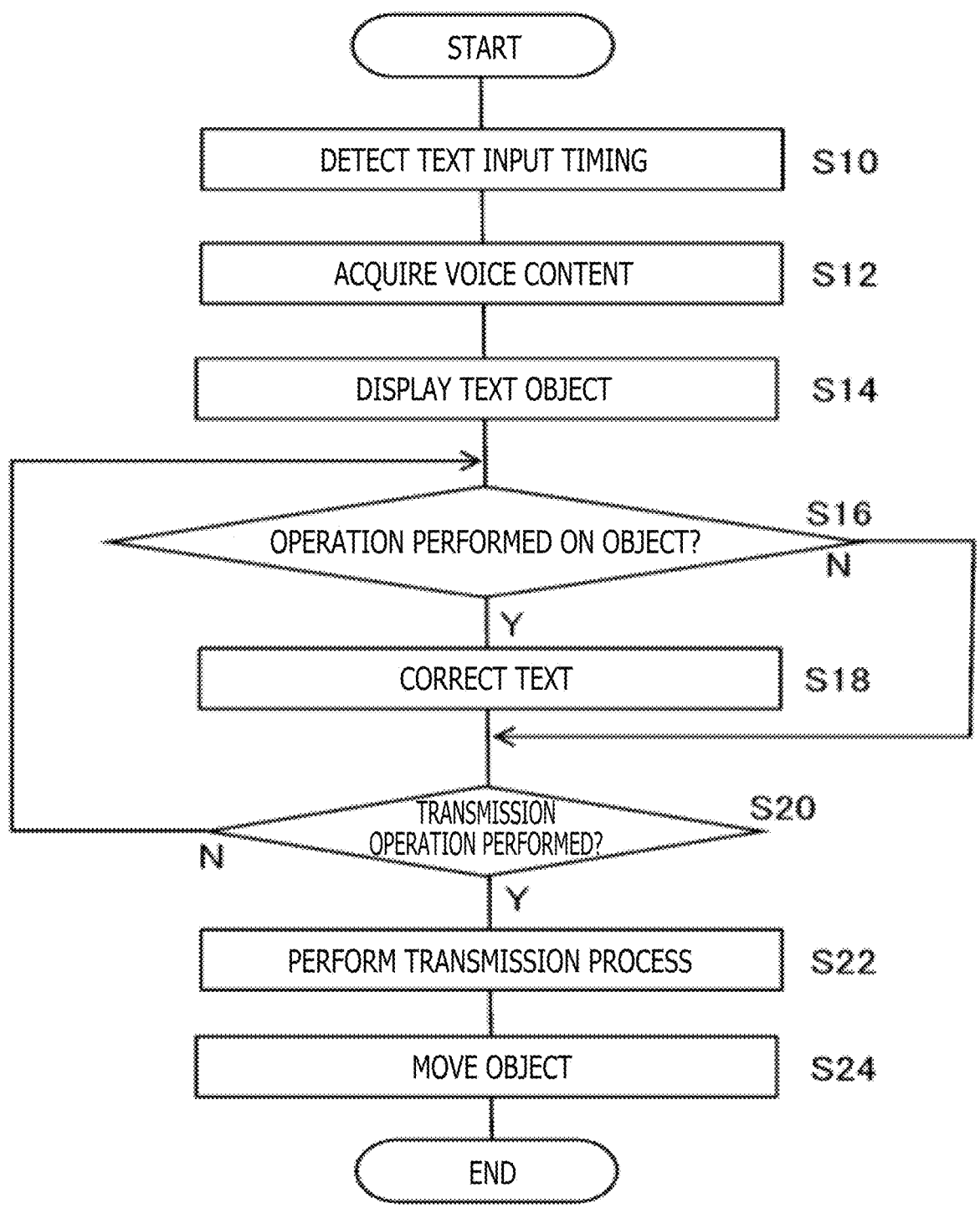
FIG. 11 is a flowchart illustrating a procedure that the image processing apparatus according to the embodiment follows when performing processing related to text input.

Operations of the image processing apparatus 10 implemented by the above-described configuration will now be described. FIG. 11 is a flowchart illustrating a procedure that the image processing apparatus 10 according to the present embodiment follows when performing processing related to text input. This flowchart starts, for example, in a state where the user is viewing content displayed on the head-mounted display 100. Further, the example of FIG. 11 assumes that a sentence is created and transmitted, for example, to a conversation partner.

First of all, when the user makes a predetermined gesture in order to start text input, the text object control section 50 detects that gesture and starts processing (step S10). The text object control section 50 may detect predetermined gestures indicative of a processing start time point and a processing end time point and present all voices uttered between the two time points as text objects. Alternatively, the text object control section 50 may present, as a text object, only a voice uttered while the user is making a predetermined gesture or assuming a predetermined posture, for example, by cupping the hands of the user like a megaphone and attaching the hands to a user's mouth.

Subsequently, the object generation section 52 in the text object control section 50 acquires the contents of a voice uttered by the user from the voice recognition section (step S12). Here, the contents of the voice are substantially text information indicative of a voice. However, the voice recognition section 62 performs conversion to text information in accordance with a general algorithm, and the object generation section 52 corrects the text information as needed and then presents the corrected text information as an object in a virtual space (step S14). For example, if the user is making a gesture of specifying the type of text while uttering a voice, a text object of a type corresponding to the gesture is generated.

Meanwhile, in a case where the priority levels of text to be converted vary depending on the contents of simultaneously reproduced content and on a community to which the user belongs, relevant information is read from the dictionary storage section 56 and converted to high-priority text to generate an object. A text object generated in this manner is presented as a display image by causing the image generation section 66 to project the text object onto the view screen of the head-mounted display 100 and causing the output section 68 to output the text object to the head-mounted display 100.

In the resulting state, based on information received from the voice recognition section 62 and the motion recognition section 64, the interaction processing section 54 waits for the user to perform an operation on the text object by uttering a voice or making a motion (step S16). More specifically, the interaction processing section 54 receives a user's operation that is performed to touch a part of the text object in the virtual space and correct or delete relevant text by uttering a voice or making a motion. Alternatively, the interaction processing section 54 receives a user's operation that is performed to add an emoticon or a code by uttering a voice or making a gesture. When such an operation is performed ("Yes" at step S16), the interaction processing section 54 applies a corresponding correction to the text object.

In the above instance, the haptic control section 70 transmits a control signal to the haptic device 134 at each time point so as to make the user feel as if the user is touching the text object or performing various other operations. Further, the interaction processing section 54 waits for an operation of transmitting text information created by the above-mentioned voice or gesture (step S20). Before such a transmission operation is performed, the interaction processing section 54 receives a correction operation ("No" at step S20). When the transmission operation is performed after completion of the correction operation ("No" at step S16 and "Yes" at step S20), the interaction processing section 54 reports such a situation to the communication section 60, and thus allows the communication section 60 to perform a transmission process (step S22).

In the above instance, the position control section 58 moves a transmitted text object to a different location in the virtual space (step S24). The illustrated flowchart depicts a series of processing steps for creating and transmitting a sentence. Therefore, in order to create and transmit another sentence, it is necessary to repeat the same processing steps. When a previously transmitted sentence is to be canceled and corrected as described earlier, a process for canceling a transmission and a process for restoring an object position should be additionally performed instead of performing steps S10 to S14.

The present embodiment, which has been described above, presents a voice uttered by a user as a text object in a virtual space. Further, the present embodiment enables the user to virtually handle the text object with the hands of the user. Therefore, text can be inputted without using a keyboard or other input apparatus. Furthermore, even if a voice is erroneously recognized, such a recognition error can be corrected with ease. In such an instance, the trouble of making corrections can be minimized by using a dictionary unique to simultaneously reproduced content or a community to which the user belongs.

Moreover, creating a specific situation where text is interacted with in a virtual space makes it possible to implement a user-friendly interface as compared with a case where, for example, a keyboard and a cursor are used. High entertainment and efficiency can be both provided, for example, by enabling the user to input an emoticon by grabbing and moving a user's face in a simulated manner or correct text by turning a relevant text object over. Additionally, transmitted text information can be moved and left at a different location in the virtual space. This ensures that transmission can be easily canceled or corrected by performing an intuitive operation.

The present disclosure has been described above with reference to the foregoing embodiment. It should be understood by those skilled in the art that the foregoing embodiment is illustrative, and that the combination of components and processes described in conjunction with the foregoing embodiment can be modified in various ways, and further that such modifications also fall within the scope of the present disclosure.

For example, the foregoing embodiment assumes that a captured image of a user's hand or a graphics image simulating the captured image of the user's hand is used as a hand interacting with an on-screen text object. Meanwhile, AR eyeglasses displaying a virtual object in such a manner as to let it merge with a real image may be used as eyeglasses through which a real-world image is to be transmitted. In such a case, the image of the user's hand may be a real image transmitted through eyeglasses, and the text object control section 50 causes the AR eyeglasses to display a text object only. Even when such a configuration is adopted, the same advantage is obtained as in the foregoing embodiment.

What is claimed is:

1. An image processing apparatus comprising:
a voice recognition section that recognizes a voice uttered by a user;
a motion recognition section that recognizes a motion of the user;
a text object control section that disposes an object of text representative of the contents of the voice in a three-dimensional virtual space, and varies text by implementing interaction based on the motion; and
an image generation section that displays an image with the three-dimensional virtual space projected thereon,
wherein the image generation section displays both an image of content and an image formed by the projection, and
wherein, in accordance with priority levels retained for different pieces of the content, the text object control section determines text to be presented as the object.

2. The image processing apparatus according to claim 1, wherein
in accordance with a voice uttered or a motion made while the object of text in a virtual space is touched by the user, the text object control section corrects or deletes the text.

3. The image processing apparatus according to claim 2, wherein
the text object control section varies the type of correction in accordance with the orientation of a finger touching the object of text in a virtual space.

4. The image processing apparatus according to claim 1, wherein
in accordance with a motion of pinching the object of text in a virtual space and turning the object of text over, the text object control section corrects the text.

5. The image processing apparatus according to claim 4, wherein
the text object control section changes corrected text in accordance with the combination of fingers pinching the object of text in a virtual space.

6. The image processing apparatus according to claim 1, wherein
the text object control section disposes an object of an emoticon in the virtual space in accordance with a user's motion of placing a user's face in the virtual space.

7. The image processing apparatus according to claim 6, wherein
the text object control section causes the emoticon to reflect a user's facial expression at the beginning of the user's motion of placing the user's face in the virtual space.

8. The image processing apparatus according to claim 6, wherein
in accordance with a voice uttered or a motion made while the object of the emoticon is touched by the user, the text object control section corrects the facial expression of the emoticon.

9. The image processing apparatus according to claim 1, wherein
in accordance with a user's gesture made simultaneously with voice utterance, the text object control section determines the type of text to be presented as an object.

10. The image processing apparatus according to claim 1, wherein
in accordance with a user's gesture, the text object control section adds an object representative of a corresponding code to the object of text.

11. The image processing apparatus according to claim 1, wherein
the text object control section presents, as the object of text, only a voice uttered while the user is making a predetermined gesture.

12. The image processing apparatus according to claim 1, further comprising:
a communication section that, in accordance with an operation of transmitting a text string presented as the object, transmits data on the text string to a communication partner, wherein
the text object control section moves the object of the transmitted text string to a predetermined location in the virtual space.

13. The image processing apparatus according to claim 12, wherein
in accordance with a user's motion made or a user's voice uttered with respect to the object of the text string, the text object control section requests the communication section to transmit data on the text string.

14. The image processing apparatus according to claim 12, wherein
in accordance with a user's motion of pulling back a moved object of a text string, the text object control section requests the communication section to cancel the transmission of data on the text string.

15. The image processing apparatus according to claim 1, wherein
in accordance with the priority levels learned from the results of previous text conversion by a plurality of users, the text object control section determines text to be presented as the object.

16. The image processing apparatus according to claim 1, wherein
the motion recognition section recognizes the motion in accordance with an image acquired from, at least one of a visible-light camera, a multispectral camera, and a depth camera or with a value measured by a sensor worn by a user.

17. The image processing apparatus according to claim 1, further comprising:
a haptic control section that causes a haptic device worn by a user to present a haptic stimulus corresponding to a user's motion with respect to the object.

18. An image processing method used by an image processing apparatus, the image processing method comprising:
recognizing a voice uttered by a user;
recognizing a motion of the user;
disposing an object of text representative of the contents of the voice in a three-dimensional virtual space;
causing a display apparatus to display an image with the three-dimensional virtual space projected thereon;
varying the text by implementing interaction with the object in accordance with the motion;
displaying an image with the three-dimensional virtual space projected thereon;
displaying both an image of content and an image formed by the projection, and
determining text to be presented as the object in accordance with priority levels retained for different pieces of the content.

19. A non-transitory computer readable medium having stored thereon a program for a computer, comprising:
by a voice recognition section, recognizing a voice uttered by a user;
by a motion recognition section, recognizing a motion of the user;
by a text object control section, disposing an object of text representative of the contents of the voice in a three-dimensional virtual space and varying the text by implementing interaction in accordance with the motion; and
by an image generation section, displaying an image with the three-dimensional virtual space projected thereon,
wherein the image generation section displays both an image of content and an image formed by the projection, and
wherein, in accordance with the priority levels retained for different pieces of the content, the text object control section determines text to be presented as the object.

* * * * *